July 24, 1928.
D. W. PRATT
1,678,197
DIRECTION SIGNAL
Filed Feb. 15, 1926
2 Sheets-Sheet 1
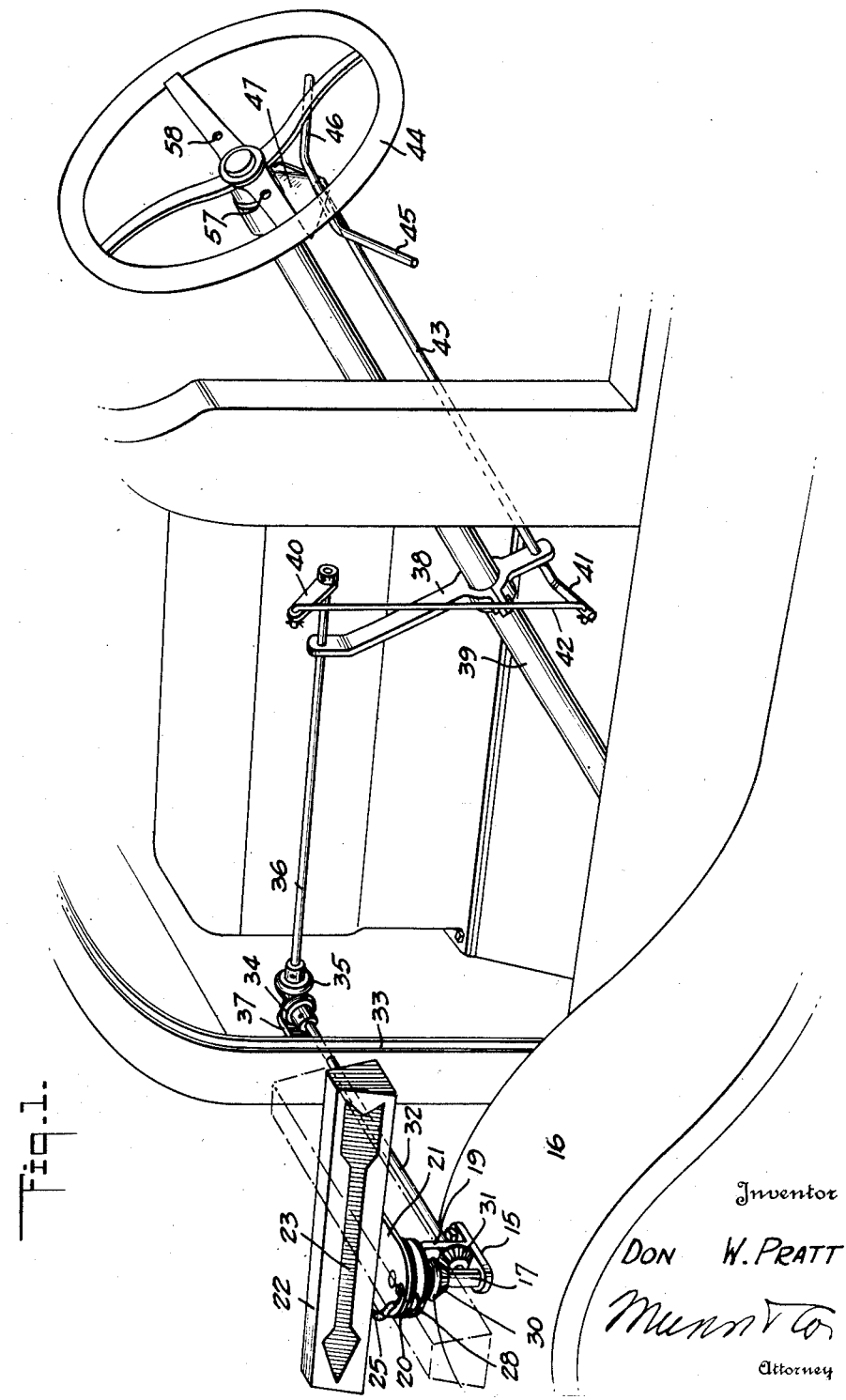

July 24, 1928.
D. W. PRATT
DIRECTION SIGNAL
Filed Feb. 15, 1926        2 Sheets-Sheet 2
1,678,197
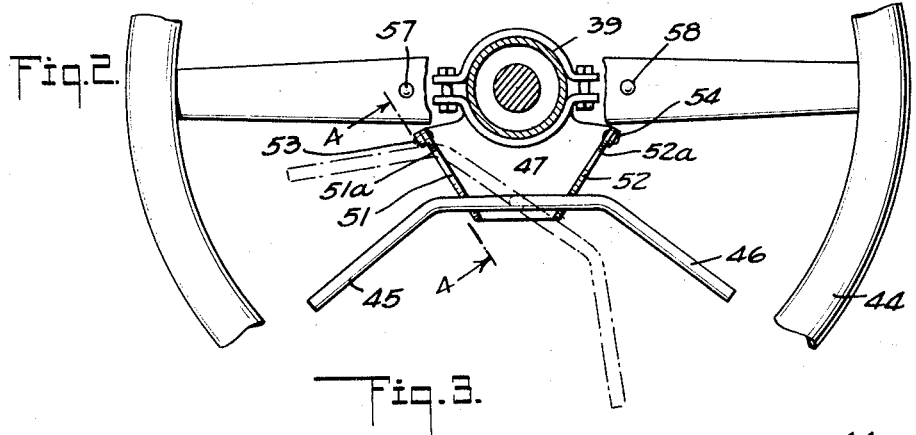
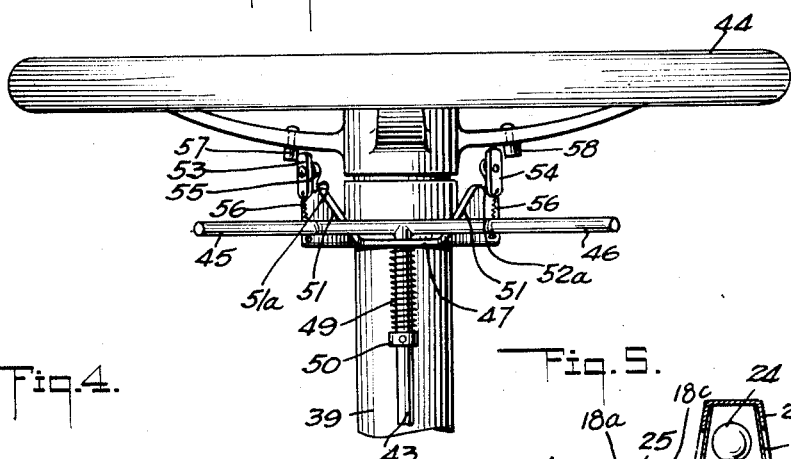
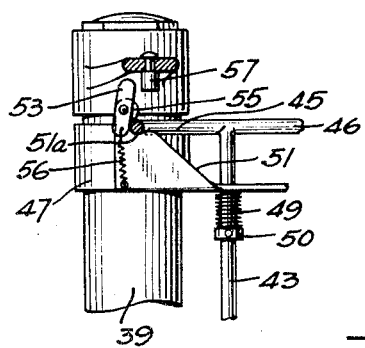
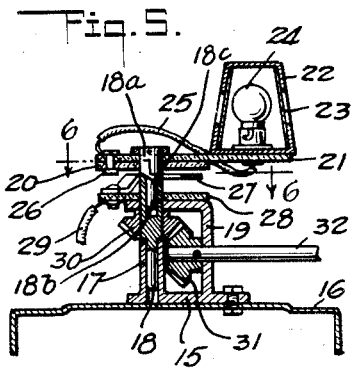
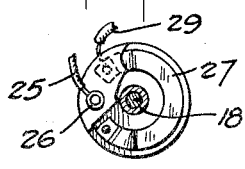
Inventor
DON W. PRATT
By
Attorney Patented July 24, 1928.

1,678,197

UNITED STATES PATENT OFFICE.

DON W. PRATT, OF SANTA MONICA, CALIFORNIA.

DIRECTION SIGNAL.

Application filed February 15, 1926. Serial No. 88,382.

My invention relates to direction signals for motor vehicles, and a purpose of my invention is the provision of a direction signal capable of being associated with the conventional steering mechanism of a motor vehicle so as to utilize the operation of such mechanism in restoring the signal to a normal position following the manual actuation of the signal to give a direction indication. More specifically, my invention embodies the provision of a direction signal which, in its normal position, gives a "Forward" direction indication but is manually movable to give a "Left" or "Right" direction indication and to maintain either indication until the steering wheel of a steering mechanism is manipulated to effect turning of the vehicle in the direction indicated when the signal is actuated by rotation of the steering wheel to restore the signal to its normal position.

I will describe only one form of direction signal embodying my invention and will then point out the novel features thereof in claims.

In the accompanying drawings,

Figure 1 is a view showing in perspective one form of direction signal embodying my invention in applied position to a motor vehicle;

Figure 2 is an enlarged fragmentary plan view of the steering wheel shown in Figure 1 with the direction signal in applied position thereto and a portion of the latter in section;

Figure 3 is a view showing the steering wheel and column in side elevation and with the direction signal in applied position thereto;

Figure 4 is a sectional view taken on the line 4—4 of Figure 2;

Figure 5 is a view showing in central vertical section the signal element of the direction signal and its mounting;

Figure 6 is a sectional view taken on the line 6—6 of Figure 5.

Similar reference characters refer to similar parts in each of the several views.

Referring specifically to the drawings, my invention, in its present embodiment, comprises a bracket 15 adapted to be suitably secured to the left hand front fender 16 of a motor vehicle, this bracket including a sleeve 17 in which is journaled a pintle 18 which extends upwardly through an L-shaped arm 19. To the upper end of the pintle 18 is fixed a disk 20 of insulating material and secured to this disk, as well as to the pintle, is a flat arm 21 also formed of insulating material and having secured thereto a signal element comprising a box 22 having transparent arrow-shaped openings 23 in the opposite sides thereof and an electric lamp 24 interiorly thereof. Current is adapted to be supplied to the lamp 24 through a conductor 25 connected to a contact 26 (Figures 5 and 6), which is movable with the disk 20 to engage an arcuate contact 27 secured to a disk 28 of insulating material supported on the arm 19. A conductor 29 is connected to the contact 27 and extends to a suitable source of current (not shown), it being understood that one pole of the source of current is grounded through the vehicle frame and one terminal of the lamp 24 is likewise grounded, so that when the contact 26 engages the contact 27 current will be supplied to the lamp 24.

The signal element normally occupies the position shown in solid lines in Figure 1, in which the arrows 23 are positioned to indicate a "Forward" direction. From this position the signal element is adapted to be moved 90 degrees in either direction to give a "Left" or "Right" indication, and the signal element is moved to either of these two positions by the following mechanism: a miter pinion 30 is fixed to the pintle 18 to constantly mesh with a similar pinion 31 keyed to a shaft 32 journaled in the arm 19 and extending through the radiator frame 33 of the motor vehicle, where it is provided with a bevel pinion 34 meshing with a similar pinion 35 fixed to a shaft 36. A bracket 37 is secured to the frame 33 to support the ends of the shafts 32 and 36, as will be understood, and the shaft 36 extends rearwardly along one side of the engine, as shown in Figure 1, and is rotatably supported in the upper end of a two-part bracket 38 clamped to the steering column 39 of the usual steering mechanism for a motor vehicle. The rear end of the shaft 36 is provided with a crank arm 40, and this arm is operatively connected to a similar arm 41 by means of a link 42, the arm 41 being formed on the lower end of a shaft 43 journaled in the lower end of the bracket 38 and extending upwardly through the cowl of the motor vehicle in substantially parallel relation to the steering column 39. The upper end of the shaft 43 which is disposed adjacent the steering wheel 44 is provided with two lateral extensions or arms 45 and 46 adapted to be gripped by the driver of the vehicle and rotating the shaft in either direction to effect actuation of the signal element. The upper end of the shaft is shown in Figure 3 as rotatably mounted in a bracket 47 suitably clamped to the upper end of the steering column and forming an abutment for the upper end of an expansible spring 49 which is associated with a collar 50 secured to the shaft 43 to normally urge the shaft downwardly and thereby maintain the arms 45 and 46 in engagement with the edges of cams 51 and 52, respectively, formed on the bracket 47. These cams 51 and 52 are formed at their upper ends with notches 51ª and 52ª, respectively, in which the arms 45 and 46 are adapted to be received and thus latched in an elevated position and to thereby retain the shaft 43 in an elevated position against the tension of the spring 49. The arms may be removed from the notches by means of tripping levers 53 and 54, respectively, pivoted on extensions 55 of the bracket 47 and normally urged to non-tripping positions by means of springs 56. Detents 57 and 58 are secured to two spokes of the steering wheel 44 so as to engage the tripping levers 53 and 54 as the wheel is rotated and thereby actuate the levers to remove the arms from the notches.

The operation of the direction signal is as follows: With the signal element in the normal position shown in Figure 1, the lamp 24 is not illuminated because of the fact that the contact 26 is out of engagement with the contact 27. In this normal position of the signal element, the shaft 43 is urged to its lowermost position by the spring 49 so that the arms 45 and 46 are at the lower edges of the cams 51 and 52. When desiring to move the signal element 90 degrees in one direction or the other to give a "Right" or "Left" indication, one arm 45 or the other 46 is pushed forwardly by the operator so as to ride upwardly of the cam 51 or 52. During this movement, the shaft 43 is rotated in one direction or the other, thereby moving the signal element to the desired indicating position, and simultaneous with this movement the arm riding upwardly of the cam elevates the shaft 43 against the tension of the spring 49 until the arm reposes within the notch 51ª or 52ª. By this operation, it will be seen that the signal element following its movement to signal position is retained in such position as long as the arm remains within the notch. By now rotating the steering wheel 44 in the normal operation of the steering mechanism to guide the vehicle around a corner, one detent 57 or 58 is actuated to engage the corresponding tripping lever 53 or 54 as the steering wheel is rotated in the direction in which the vehicle is being turned but because of the pivotal mounting of the tripping lever it will be clear by reference to Figure 4 that as the detent moves to this position the lever will swing in such direction as to not remove the corresponding arm from the notch. Thus the signal element remains in signaling position while the vehicle is turning a corner. However, in reversing rotation of the steering wheel to restore the vehicle to straightaway travel following the turning of the corner, the detent 57 or 58 engages one lever 53 or 54 in the reverse direction so that the lever is actuated to remove the arm 45 or 46 from its corresponding notch, whereby the spring 49, in its expanding movement, will lower the shaft 43 to normal position and the arm 45 or 46 sliding downwardly of the cam will operate to rotate the shaft 43 sufficiently to return the signal element to normal position.

By virtue of the arrangement of contacts 26 and 27, the lamp 24 will be illuminated while the signal element is in either of its two indicating positions, and following the return of the signal element to normal position the lamp will be extinguished.

It is to be noted that the pintle 18 as shown in Figure 5 is provided with an upper section 18ª to which the arm 21 is actually secured, and this section is provided with a depending pin 18ᵇ rotatable in the upper bored end of the pintle. The confronting ends of the pintle and section are beveled as at 18ᶜ so that in the normal rotation of the pintle the section will be rotated therewith to move the signal element, but should the signal element in its projecting position with respect to the car fender be accidentally struck, the signal element will be free to rotate independently of the pintle 18, thus preventing destruction of the signal and its mounting.

An important feature of my invention is the provision of a mechanism which is adapted to be manually operated to move or cause to move a direction signal from a normal position to any one of a plurality of direction indicating positions, the nature of the mechanism being such as to maintain the signal in any position to which it has been moved until the steering mechanism has been partly or wholly operated in the turning of a vehicle when the mechanism is actuated to cause the return of the signal to its normal position. In the foregoing broad statement of my invention, I desire it to be understood that the mechanism correlated to the steering mechanism is capable of application to other forms of direction signals than the one shown. For example, it may be applied to vacuum and electrically operated signals to return a valve or switch, respectively, to a normal position conveniently with the operation of the steering mechanism.

I claim as my invention:

1. In a direction signal, rotatable mechanism for rotating a signal element in either direction including a manually operable shaft rotatable and movable longitudinally, means for urging the shaft longitudinally in one direction, arms fixed on the shaft, cams correlated to the arms for moving the shaft longitudinally against the action of said urging means when the shaft is rotated in either direction from its normal position, notches in the cams for latching the arms against movement following rotation of the shaft, tripping levers operable to remove the arms from the notches after the steering mechanism has been wholly turned and thereby permit the urging means to return the shaft to its normal longitudinal position and to cause the cams to rotate the shaft to its normal circumferential position, and detents adapted for mounting on a steering wheel and operable thereby to engage and trip the levers.

2. In a direction signal, means for actuating a signal element yieldably urged to a position in which the signal element occupies one direction indicating position, but manually operable to other direction indicating positions, means operable upon movement of said means to latch the latter against return to its normal position to retain the signal element in any of the other direction indicating positions until the turn of the steering wheel is wholly completed, and tripping means for the latching means adapted to be actuated by movement of a steering mechanism whereby the signal element is returned to its normal direction indicating position.

3. In a direction signal, manually operable means for moving signal element to either of two extreme positions, and means adapted for correlation with the steering mechanism of a motor vehicle for actuating the first means to return the signal element to normal position when the operation of the steering mechanism to restore the vehicle to a straightaway path of travel following the turning of the vehicle, has been completed.

4. A direction signal as embodied in claim 1 wherein yieldable means is provided for causing the tripping levers to return to normal position following their actuation by said detents.

DON W. PRATT.